United States Patent [19]

Regent

[11] Patent Number: 5,287,360
[45] Date of Patent: Feb. 15, 1994

[54] DEVICE FOR INSERTING INFORMATION BITS INTO A SPECIFIC FRAME STRUCTURE

[75] Inventor: Philippe Regent, Dourdan, France
[73] Assignee: Alcatel Cit, Paris, France
[21] Appl. No.: 26,115
[22] Filed: Mar. 1, 1993

Related U.S. Application Data

[63] Continuation of Ser. No. 633,860, Dec. 26, 1990, abandoned.

[30] Foreign Application Priority Data

Dec. 27, 1989 [FR] France .................... 89 17256

[51] Int. Cl.$^5$ ............................................. H04J 3/02
[52] U.S. Cl. ...................................... 370/112; 370/79; 370/102
[58] Field of Search ..................... 370/79, 102, 112

[56] References Cited

U.S. PATENT DOCUMENTS

| | | | |
|---|---|---|---|
| 4,884,268 | 11/1989 | Goto | 370/102 |
| 4,920,547 | 4/1990 | Murakami | 370/102 X |
| 5,030,951 | 7/1991 | Eda et al. | 370/102 X |
| 5,067,126 | 11/1991 | Moore | 370/102 X |
| 5,091,907 | 2/1992 | Wettengel | 370/102 |

FOREIGN PATENT DOCUMENTS

| | | | |
|---|---|---|---|
| 0334357 | 9/1989 | European Pat. Off. | H04J 3/06 |
| 2641488 | 3/1978 | Fed. Rep. of Germany | H04Q 11/04 |
| 3600795 | 7/1987 | Fed. Rep. of Germany | H04L 25/38 |

Primary Examiner—Douglas W. Olms
Assistant Examiner—Russell W. Blum
Attorney, Agent, or Firm—Sughrue, Mion, Zinn, Macpeak & Seas

[57] ABSTRACT

A device for inserting information bits into a specific frame structure essentially comprises an elastic memory whose capacity is designed to contain at each time defined by a reduced insertion bit rate D2/N a variable number of bits of words read in a buffer memory written at a reduced bit rate D1/N not yet inserted or not yet reinserted in the outgoing frames, this number varying according to justification commands generated previously, devices for selecting bits contained in said elastic memory for insertion or reinsertion in the outgoing frames, and devices for temporarily blocking the buffer memory read clock if the number of bits to store in the elastic memory exceeds a predetermined limit value.

7 Claims, 6 Drawing Sheets

FIG.4A

| | M0 M1 M2 M3 | A0 A1 A2 A3 | B0 B1 B2 B3 | C0 C1 C2 C3 | EC | α | β |
|---|---|---|---|---|---|---|---|
| $t_0$ | $e_0$ $e_1$ $e_2$ $e_3$ | | | | | | |
| $t_1$ | $e_4$ $e_5$ $e_6$ $e_7$ | $e_0$ $e_1$ $e_2$ $e_3$ | | | | | |
| $t_2$ | $e_8$ $e_9$ $e_{10}$ $e_{11}$ | $e_4$ $e_5$ $e_6$ $e_7$ | $e_0$ $e_1$ $e_2$ $e_3$ | $e_0$ $e_1$ $e_2$ $e_3$ | 1 | 1 | 0 |
| $t_3$ | $e_{12}$ $e_{13}$ $e_{14}$ $e_{15}$ | $e_8$ $e_9$ $e_{10}$ $e_{11}$ | $e_4$ $e_5$ $e_6$ $e_7$ | $e_7$ $e_5$ $e_6$ $e_7$ | 2 | 0 | 1 |
| $t_4$ | $e_{16}$ $e_{17}$ $e_{18}$ $e_{19}$ | $e_{12}$ $e_{13}$ $e_{14}$ $e_{15}$ | $e_8$ $e_9$ $e_{10}$ $e_{11}$ | $e_7$ $e_8$ $e_9$ $e_{10}$ | | | |
| $t_5$ | $e_{20}$ $e_{21}$ $e_{22}$ $e_{23}$ | $e_{16}$ $e_{17}$ $e_{18}$ $e_{19}$ | $e_{12}$ $e_{13}$ $e_{14}$ $e_{15}$ | $e_{14}$ $e_{13}$ $e_{14}$ $e_{17}$ | 3 | 1 | 1 |
| $t_6$ | $e_{24}$ $e_{25}$ $e_{26}$ $e_{27}$ | $e_{20}$ $e_{21}$ $e_{22}$ $e_{23}$ | $e_{16}$ $e_{17}$ $e_{18}$ $e_{19}$ | $e_{18}$ $e_{19}$ $e_{20}$ $e_{21}$ | | | |
| $t_7$ | $e_{28}$ $e_{29}$ $e_{30}$ $e_{31}$ | $e_{24}$ $e_{25}$ $e_{26}$ $e_{27}$ | $e_{20}$ $e_{21}$ $e_{22}$ $e_{23}$ | $e_{21}$ $e_{22}$ $e_{23}$ $e_{24}$ | 0 | 0 | 0 |
| $t_8$ | $e_{32}$ $e_{33}$ $e_{34}$ $e_{35}$ | $e_{28}$ $e_{29}$ $e_{30}$ $e_{31}$ | $e_{24}$ $e_{25}$ $e_{26}$ $e_{27}$ | $e_{25}$ $e_{26}$ $e_{27}$ $e_{28}$ | | | |
| $t_9$ | $e_{32}$ $e_{33}$ $e_{34}$ $e_{35}$ | $e_{28}$ $e_{29}$ $e_{30}$ $e_{31}$ | $e_{24}$ $e_{25}$ $e_{26}$ $e_{27}$ | $e_{28}$ $e_{29}$ $e_{30}$ $e_{31}$ | 1 | 1 | 0 |
| $t_{10}$ | | | | | | | |

FIG. 4B

| | M0 M1 M2 M3 | A0 A1 A2 A3 | B0 B1 B2 B3 | C0 C1 C2 C3 | EC | α | β |
|---|---|---|---|---|---|---|---|
| $t_0$ | $e_0$ $e_1$ $e_2$ $e_3$ | $\boxed{e_0\ e_1\ e_2\ e_3}$ | | | | | |
| $t_1$ | $e_4$ $e_5$ $e_6$ $e_7$ | $e_4$ $e_5$ $e_6$ $e_7$ | $e_0$ $e_1$ $e_2$ $e_3$ | $e_0$ $e_1$ $e_2$ $e_3$ | 1 | 1 | 0 |
| $t_2$ | $e_8$ $e_9$ $e_{10}$ $e_{11}$ | $e_8\ e_9\ \boxed{e_{10}\ e_{11}}$ | $e_4$ $e_5$ $e_6$ $\boxed{e_7}$ | $e_4$ $e_5$ $e_6$ $\underline{e_7}$ | 2 | 0 | 1 |
| $t_3$ | $e_{12}$ $e_{13}$ $e_{14}$ $e_{15}$ | $e_{12}\ e_{13}\ \boxed{e_{14}\ e_{15}}$ | $e_8$ $e_9$ $e_{10}$ $e_{11}$ | $\underline{e_7}$ $e_8$ $e_9$ $e_{10}$ | 3 | 1 | 1 |
| $t_4$ | $e_{16}$ $e_{17}$ $e_{18}$ $e_{19}$ | $e_{16}\ \boxed{e_{17}}\ e_{18}\ e_{19}$ | $e_{12}\ \boxed{e_{13}}\ e_{14}\ e_{15}$ | $e_{11}\ e_{12}\ e_{13}\ \underline{e_{14}}$ | 0 | 0 | 0 |
| $t_5$ | $e_{20}$ $e_{21}$ $e_{22}$ $e_{23}$ | $e_{20}$ $e_{21}$ $e_{22}$ $e_{23}$ | $e_{16}$ $e_{17}$ $e_{18}$ $e_{19}$ | $\underline{e_{14}}$ $e_{15}$ $e_{16}$ $e_{17}$ | | | |
| $t_6$ | $e_{24}$ $e_{25}$ $e_{26}$ $e_{27}$ | $\boxed{e_{24}}$ $e_{25}$ $e_{26}$ $e_{27}$ | $e_{20}\ \boxed{e_{21}\ e_{22}\ e_{23}}$ | $e_{18}$ $e_{19}$ $e_{20}$ $\underline{e_{21}}$ | 2 | 1 | 0 |
| $t_7$ | $e_{28}$ $e_{29}$ $e_{30}$ $e_{31}$ | $e_{28}$ $e_{29}$ $e_{30}$ $e_{31}$ | $e_{24}$ $e_{25}$ $e_{26}$ $e_{27}$ | $\underline{e_{21}}$ $e_{22}$ $e_{23}$ $e_{24}$ | | | |
| $t_8$ | $e_{32}$ $e_{33}$ $e_{34}$ $e_{35}$ | $e_{28}\ e_{29}\ \boxed{e_{30}\ e_{31}}$ | $e_{24}$ $e_{25}$ $e_{26}$ $\boxed{e_{27}}$ | $e_{25}$ $e_{26}$ $e_{27}$ $\underline{e_{28}}$ | 2 | 0 | 1 |
| $t_9$ | $e_{32}$ $e_{33}$ $e_{34}$ $e_{35}$ | | | $\underline{e_{28}}$ $e_{29}$ $e_{30}$ | | | |

DEVICE FOR INSERTING INFORMATION BITS INTO A SPECIFIC FRAME STRUCTURE

This is a continuation of application Ser. No. 07/633,860 filed Dec. 26, 1990, abandoned.

BACKGROUND OF THE INVENTION

1. Field of the Invention

The present invention concerns digital transmission and in particular time-division multiplex digital transmission.

2. Description of the Prior Art

The frame structures of time-division multiplex digital bit streams vary according to the bit rate of the tributaries to be multiplexed and are mostly the subject of CCITT recommendations.

They usually include time slots reserved for transmitting information signals representing the traffic payload and time slots reserved for transmitting auxiliary signals such as order wire or justification signals.

The present invention is more particularly concerned with a device for inserting bits constituting a digital bit stream having a given bit rate into time slots of a given frame structure reserved for transmitting information signals.

The invention is particularly applicable to the construction of frames for time-division multiplexed digital bit streams produced by multiplexing digital tributaries at different bit rates using a synchronous multiplexing hierarchy as defined in CCITT Recommendations G.707, G.708 and G.709.

The theory of a multiplexing hierarchy of this kind is outlined in FIG. 1. The various bit rates that can be multiplexed by this hierarchy are the bit rates of 2 408 kbit/s, 8 448 kbit/s, 34 368 kbit/s, 1 554 kbit/s, 6 312 kbit/s, 44 736 kbit/s and 139 264 kbit/s recommended by the CCITT and listed down the righthand side of this figure.

There are various possible multiplexing structures for this multiplexing hierarchy depending on the bit rates of the tributaries to be multiplexed for a given application, and each multiplexing structure (such as that shown in bold line in this figure) representing tributaries to be multiplexed with bit rates of 1 544 kbit/s, 2 048 kbit/s, 8 448 kbit/s and 34 368 kbit/s comprises a number of hierarchy levels, denoted N1, N2, N3 in the example under consideration, running from right to left in the figure, in the direction in which the frames are constructed from the various tributaries.

Tributaries can be introduced and entities called containers and entities called multiplexing units can be constituted at the various hierarchy levels of a multiplexing structure. The multiplexing units constituted at a given hierarchy level and denoted TU or AU (TU11, TU12, TU22 for level N1, TU31 for level N2 and AU4 for level N3 in the example under consideration) are formed by adding to the containers constituted at the same hierarchy level signals for indexing and justifying these containers relative to these multiplexing units.

The containers constituted at a given hierarchy level and denoted VC (VC11, VC12, VC22 for level N1, VC31 for level N2 and VC4 for level N3 in the example under consideration) are each formed by adding auxiliary signals, either to a multiplex signal obtained by multiplexing together multiplexing units constituted at a lower hierarchy level, or to an information signal sampled on a tributary introduced at the level in question and denoted C (C11, C12, C22 for level N1 and C31 for level N2 in the example under consideration).

In the context of its application to the constitution of such frames, the invention is more specifically used to insert tributaries into containers. The following description makes particular reference to the insertion of a 139 264 kbit/s tributary C4 into a container VC4.

FIG. 2 shows the frame structure of a container VC4 as defined by the previously mentioned CCITT recommendations, the container VC4 being divided into superframes each formed by a succession of nine such frames.

As shown in this figure, the bits of the 139 264 kbit/s digital bit stream C4 are inserted into this frame in groups of twelve (unreferenced) bytes called information bytes and are separated by bytes X and Y called systematic insertion bytes. The first group of twelve bytes is preceded by a byte W assigned to the transmission of information bits, the byte W being itself preceded by a systematic insertion byte. The last group of twelve bytes is similarly preceded by a specific byte Z assigned partly to transmitting information bits I. The eighth bit of byte Z is a stuff bit R which is ignored when the frames of the container VC4 are received. The seventh bit of the byte Z is a justification opportunity bit S for the tributary C4 relative to the container VC4 for the frame in question and can therefore be either an information bit or a stuff bit, depending on the justification state of this frame.

Justification is a standard technique for matching the rate of the bits to be inserted and the bit insertion rate. In the example under consideration, where the justification is positive justification, the S bit of a frame is an information bit of the tributary C4 unless this tributary is justified relative to the container VC4 for the frame in question, in which case the S bit is a stuff bit. The justified or non-justified state of a frame is indicated by the value of a justification control bit C, the C bit occupying in this instance the first location of the systematic insertion bytes X.

The use of this technique conventionally requires a buffer memory into which the incoming information bits are written under the control of a write clock at the clock rate of these bits and which is read under the control of a read clock at the insertion clock rate and a comparator for comparing the phase of the write and read clocks and commanding justification as needed according to the comparison result. When justification is applied, the insertion of a justification opportunity bit in place of an information bit imposes a delay in the insertion of this information bit which is obtained by a corresponding adjustment of the buffer memory read timing.

In the example under consideration the bit rates are 139 264 kbit/s and 155 520 kbit/s. With some technologies the device performing the insertion cannot operate directly at these bit rates but only at reduced bit rates requiring division of the incoming and outgoing digital bit streams into N reduced bit rate digital bit streams, in which case the buffer memory principle mentioned above is no longer directly applicable.

An objective of the present invention is to provide an insertion device enabling operation at reduced bit rates.

SUMMARY OF THE INVENTION

The present invention consists in a device for inserting information bits into a specific frame structure at specific locations at least one of which may contain at least one justification opportunity bit, characterized in that it comprises:

means for dividing the incoming digital bit stream with bit rate D1 into N bit streams with a reduced bit rate D1/N, a buffer memory into which are written at the bit rate D1/N and read at the bit rate D2/N successive words of "n" bits from said divider means, where D2/N denotes the bit rate at which said words are inserted in the outgoing frames, associated with justification control means adapted to compare the read and write bit rates of said buffer memory, an elastic memory having a capacity determined to contain at each time defined by the reduced insertion bit rate D2/N a variable number of bits of words read in the buffer memory and not yet inserted or not yet reinserted into the outgoing frames, said number varying according to previously generated justification commands, means for selecting at each time defined by the reduced insertion bit rate D2/N, and according to previously generated justification commands, "n" bits contained in the elastic memory which are to be inserted or are to be reinserted at this time, and means for temporarily blocking the clock for reading the buffer memory if the justification command generated at a given time is such that the number of bits to be stored in the elastic memory exceeds a predetermined limit value.

Other objects and characteristics of the present invention will emerge more clearly from the following description of one embodiment given with reference to the appended drawings.

BRIEF DESCRIPTION OF THE DRAWINGS

FIGS. 4A and 4B are tables illustrating the operating principle of the elastic memory.

DETAILED DESCRIPTION OF THE INVENTION

Figure 1:
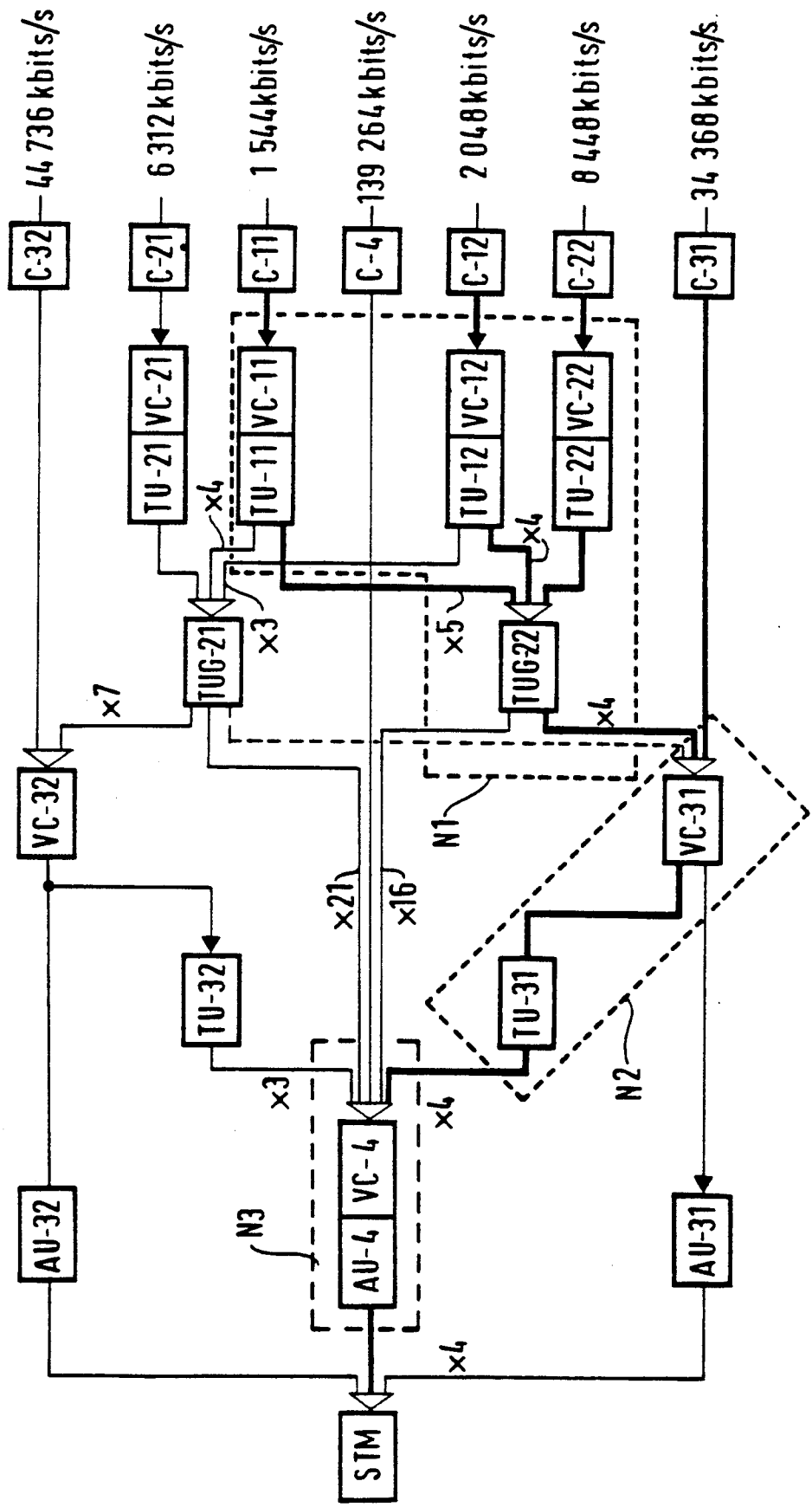
FIGS. 1 and 2 have already been described.
Figure 2:
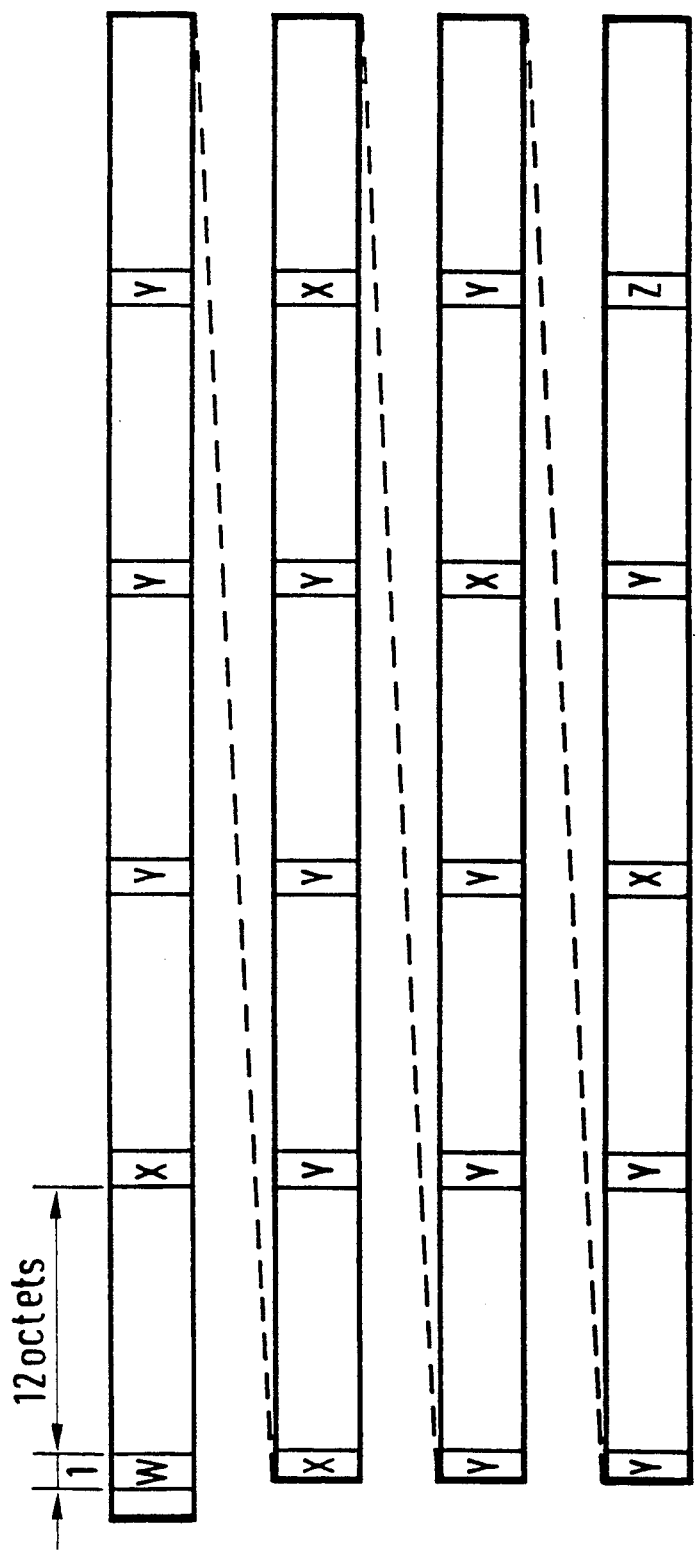
Figure 3:
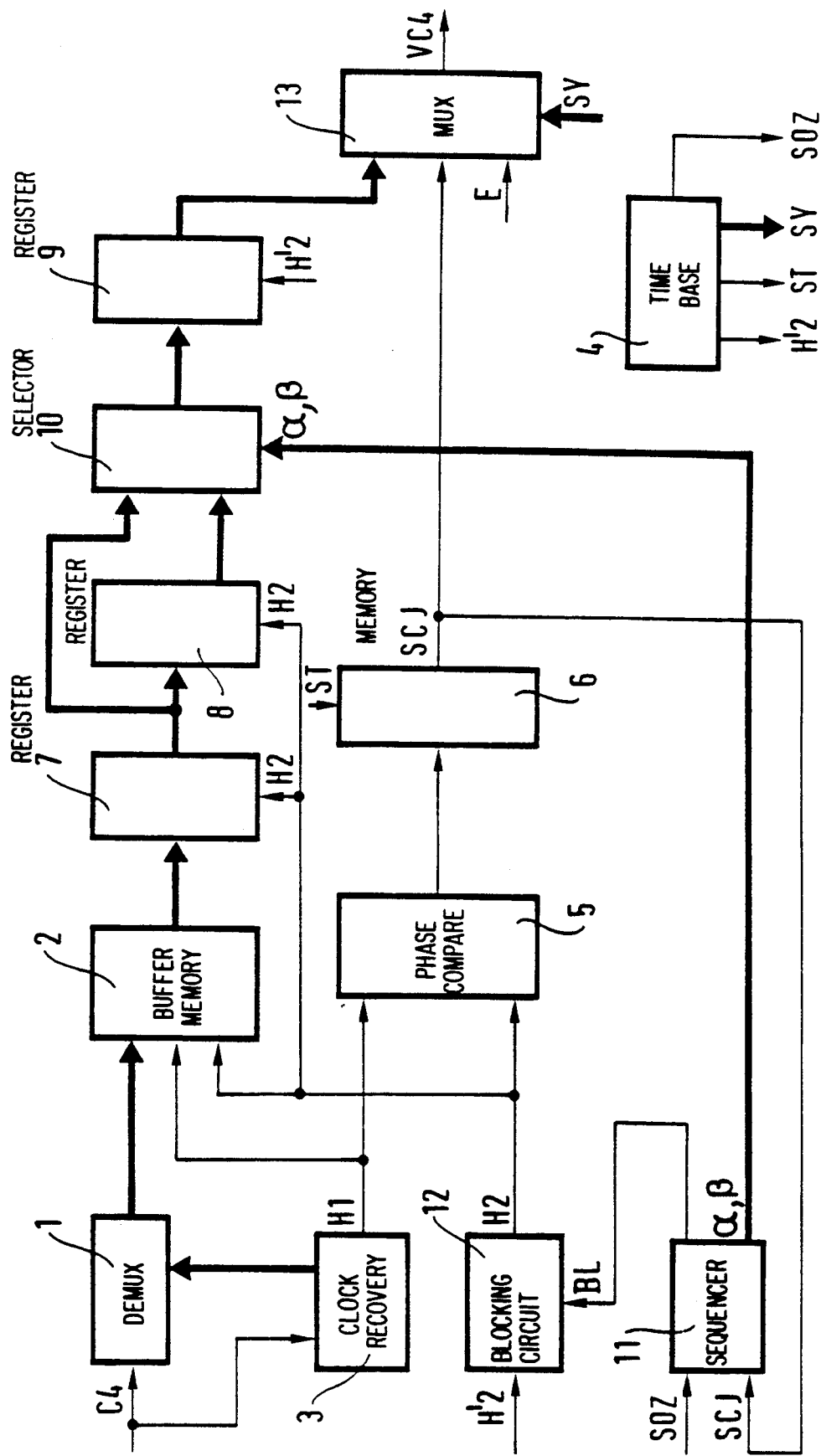
FIG. 3 is a block diagram of an insertion device in accordance with the invention.

Referring to FIG. 3, the bits of the incoming digital bit stream (in the example under consideration, of a tributary C4 with a bit rate D1 of 139 264 kbit/s) are applied to a demultiplexer 1 which in a known way divides this bit stream into N bit streams at a reduced bit rate, 34.816 kbit/s in this example, in which N takes the value 4.

The successive words each of four bits obtained at the output of the demultiplexer 1 are written into a buffer memory 2 under the control of a clock signal H1 at 34.816 kbit/s obtained by dividing by four the clock signal D1 recovered by a clock recovery circuit 3 receiving the digital bit stream C4 and controlling the demultiplexer 1.

Reading of the buffer memory 2 is controlled by a clock signal H2 with a clock rate of D2/4 where D2 designates the rate at which bits are inserted into a frame of a container VC4 in which (see below) some transitions are absent. As will be explained later, the signal H2 is obtained from a signal H'2 defining the insertion times for the four-bit words from the demultiplexer 1.

A phase comparator 5 compares the write and read command clock signals for each frame of the container VC4 and uses known criteria to establish a justification control signal SCJ which is stored for the duration of a frame in a memory 6 and which may be a direct representation of the justification control bit C.

The successive four-bit words obtained at the output of the buffer memory 2 are transferred under the control of the signal H2 into a four-bit register 7.

Before a new word is written into register 7, the word previously written into this register is transferred into a four-bit register 8 also clocked by the signal H2, the combination of the two registers therefore forming a shift register operating on four-bit words.

The four-bit word (or half-byte) to be inserted at a given time, that is to say at a given transition of the clock signal H'2, into a frame of the container VC4 is obtained at the output of a four-bit register 9 clocked by the signal H'2 into which there has been written at a previous time a half-byte which, as will be explained later, consists of either the half-byte stored in the register 7 or a half-byte formed in part by bits of the word stored in the register 7 and in part by bits of the word stored in the register 8, these bits being selected by a selector 10.

The selector 10 is controlled by signals $\alpha, \beta$ from a sequencer 11 which delivers a value of these signals updated from their previous value and on the basis of control signals comprising a signal SOZ for synchronizing second half-bytes of bytes Z of VC4 frames from the timebase 4 and the justification control signal SCJ from the memory 6 which in turn receives a VC4 frame synchronization signal ST from the timebase 4.

The combination of the registers 7 through 9, the selector 10 and the sequencer 11 will be described in more detail below.

The clock signal H2 is obtained by blocking some transitions of the clock signal H'2 using a known blocking circuit 12 controlled by the sequencer 11, as will be explained in more detail below.

The frames of the container VC4 are obtained at the output of a multiplexer 13 which receives on first inputs information half-bytes from the register 9, on a second input the justification control bit C and on third inputs bits E representing systematic insertion bits other than the justification control bit C, the bits E and bit C forming whole bytes and therefore whole half-bytes. This multiplexer is controlled by synchronization signals SY supplied by the timebase 4 and marking slots for the various bits to be inserted into the frames of the container VC4.

Note that the signal H'2 is a clock signal at the bit rate D2/4 in which the transitions representing the locations of half-bytes formed by the E and C bits are absent.

The theory of operation of the selector 10 and the sequencer 11 will now be explained with reference to the tables in FIGS. 4A and 4B, starting with FIG. 4A.

$M_0 M_1 M_2 M_3$, $A_0 A_1 A_2 A_3$, $B_0 B_1 B_2 B_3$ and $C_0 C_1 C_2 C_3$ denote the respective outputs of the buffer memory 2 and the registers 7 through 9 at which half-bytes stored therein are delivered at any half-byte time.

$e_i e_{i+1} e_{i+2} e_{i+3}$ denote the bits forming the half-byte available at a given half-byte time representing a given transition of the clock signal H'2 at the output of one of the above components, the subscripts increasing from i through i+3 representing the order in which these bits are received in the incoming digital bit stream at bit rate D1 and the increasing subscript bits being available at the respective increasing subscript outputs of the component concerned.

The various columns for these various components show the various half-bytes stored in those components for different successive half-byte times $t_i$, represented by different lines of the table.

The selector 10 selects "m" bits from the register 7 and "n−m" bits from the register 8. In this example "n" is equal to 4.

It is assumed that the initial conditions are such that the selector 10 selects at the initial time $t_0$ the four bits present at the outputs $A_0A_1A_2A_3$ of the register 7 ("m" is equal to 4).

The selector 10 continues to operate in this manner until (for example) the half-byte time $t_3$ representing the location of the second half of the byte Z for the frame in question.

At this time the fourth bit of the half-byte to be inserted is a stuff bit which, as here, may be the bit $e_7$ present just before this time at the output $A_3$. It is then necessary to repeat the bit $e_7$ at the start of the next half-byte time.

The third bit of the half-byte to be inserted is a justification opportunity bit so it may also be necessary, depending on the justification state of the frame at this time, to repeat the bit $e_6$ at the start of the next half-byte time.

To make this example more concrete, it is assumed that the frame in question is not justified so there is no need to repeat bit $e_6$. In this case the half-byte to be inserted into the frame at time $t_4$, that is to say the half-byte stored in register 9 at this time, is the half-byte $e_7e_8e_9e_{10}$, the half-byte inserted into the frame at time $t_3$ being the half-byte $e_4e_5e_6e_7$.

As the table shows, the selector 10 must therefore be set to select the fourth bit ($e_7$) of the half-byte stored in register 8 and the first three bits ($e_8e_9e_{10}$) of the half-byte stored in the register 7 ("m" is equal to 3).

The selector 10 retains this setting until the half-byte-time representing the location of the second half of the byte Z of the next frame chosen by design and without any relationship to the numerical values considered for the subscript i as being time $t_5$.

If the frame is not justified, the new setting of the selector 10 at the next time $t_6$ must enable selection of the last two bits ($e_{14}e_{15}$) of the half-byte stored in the register 8 and the first two bits ($e_{16}e_{17}$) of the half-byte stored in the register 7 ("m" is equal to 2).

Applying the same reasoning at the successive times $t_7$ and $t_8$, the new setting of the selector 10 at time $t_8$ must enable selection of the last three bits ($e_{21}e_{22}e_{23}$) of the half-byte stored in the register 8 and the first bit ($e_{24}$) of the half-byte stored in the register 7 ("m" is then equal to 1).

Making the same assumptions at the subsequent time $t_9$, the half-bytes available at the output of the memory 2 and the registers 7 and 8 must not be altered at this time and the setting of the selector 10 at time $t_{10}$ must again enable selection of the four bits of the half-byte stored in the register 7 ("m" is equal to 4 again). If the process as described were allowed to continue, the bit to be repeated under the same conditions at time $t_{10}$ would be lost.

The table in FIG. 4B repeats the table from FIG. 4A for the times $t_0$ through $t_8$ and, for time $t_9$, represents the situation in which the frame is justified. Given this assumption, the half-bytes available at the output of the memory 2 and of the registers 7 and 8 must not be altered at time $t_9$ and the selector 10, which at this time selects the last three bits of the half-byte stored in the register 8 and the first bit of the half-byte stored in the register 7, is set at time $t_{10}$ to select the last bit ($e_{27}$) of the half-byte stored in the register 8 and the first three bits ($e_{28}e_{29}e_{30}$) of the half-byte stored in the register 7.

From the point of view of storing bits not yet inserted or not yet re-inserted, the combination of the registers 7 and 8 can be regarded as a single register forming an elastic memory having a fixed main capacity of four bits (represented by the register 7) and a variable additional capacity of zero to three bits (represented by the last three bits of register 8), that is, when taken together, an elastic memory with a capacity variable between four and seven bits, in which the number of bits not yet inserted or not yet reinserted is (in this example) increased by one or two units at each half-byte time representing the second half of the byte Z, according to whether the frame in question is not justified or justified.

If the number of bits in the single register is equal to a limit value (in this example seven bits, or more generally $2n−1$ bits), which is the case at times $t_7$ and $t_8$ considered above, and if the number of bits not yet inserted or not yet reinserted must be increased (by one or two units), it is therefore necessary to block the read clock signal of the buffer memory 2, which is done at time $t_9$, failing which information would be lost.

Figure 5:
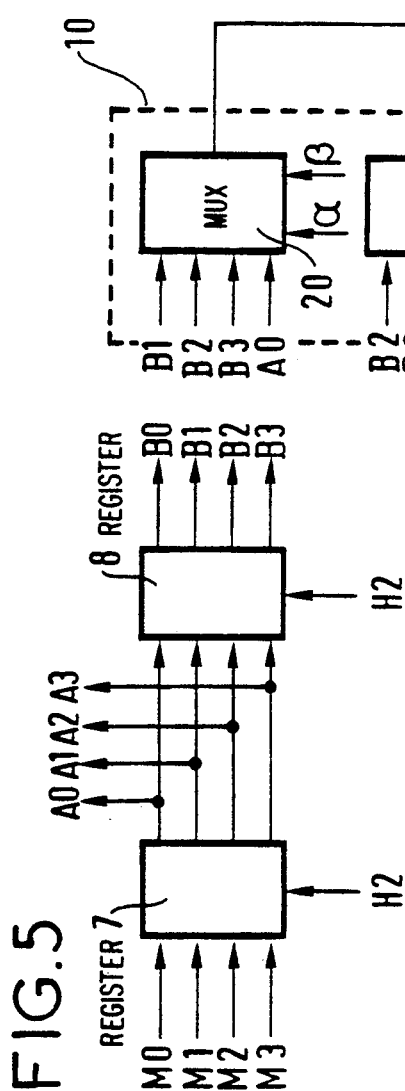
FIG. 5 is a block diagram of the elastic memory and of the bit selector means included in said elastic memory.

One embodiment of the selector 10 will now be described with reference to FIG. 5. The selector comprises four selector units or multiplexers 20, 21, 22 and 23 each with four inputs connected to the outputs $A_0A_1A_2A_3$ of the register 7 and to the outputs $B_0B_1B_2B_3$ of the register 8 in such a way as to obtain the various possible combinations shown in the FIG. 4A and 4B tables. To be more precise, the data inputs of the multiplexer 20 are connected to the outputs $A_0B_1B_2B_3$, the data inputs of the multiplexer 21 are connected to the outputs $A_0A_1B_2B_3$, the data inputs of the multiplexer 22 are connected to the outputs $A_0A_1A_2B_3$ and the data inputs of the multiplexer 23 are connected to the outputs $A_0A_1A_2A_3$.

Figure 6:
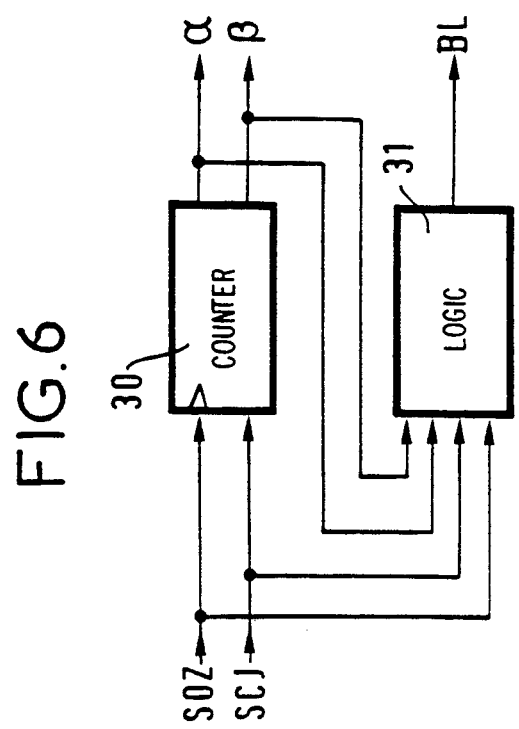
FIG. 6 is a block diagram of control means for said selector means and means for disabling the buffer memory read clock.

Each multiplexer receives on its control inputs the signals $\alpha, \beta$ from the sequencer 11 which will now be described with reference to FIGS. 6.

The sequencer comprises a counter 30 with a capacity of four clocked by the signal SOZ for synchronizing the second half-bytes of the bytes Z. This counter has an increment of one or two according to whether the frame in question is not justified or justified. It has an increment control input which receives the justification control signal SCJ from the memory 6 (FIG. 3).

The signals $\alpha, \beta$ controlling the selector 10 are obtained direct from the two parallel outputs of this counter.

The FIG. 4A and 4B tables are completed by the values of the signals $\alpha$ and $\beta$ and by the count states EC (from zero through four) of this counter for the example under consideration.

$\alpha=0$ and $\beta=0$ denote the values of the counter 30 output signals representing filling of the elastic memory formed by the registers 7 and 8 to the limit value (which is seven bits in this example, as already explained). $\alpha=\beta=1$ are the counter 30 output signal values representing the count state of this counter preceding the count state representing the values $\alpha = \beta = 0$.

$SOZ = 1$ represents the value at the actual location of the second half of a byte Z of the signal for synchronizing the second half-byte of the byte Z and $SCJ = 1$ represents the value of the synchronization control signal indicating that justification is required.

The signal BL supplied by the sequencer 11 to the circuit 12 for blocking the read clock of the buffer memory 2 is obtained at the output of the combinational logic circuit 31 implementing the following logic equation:

$$BL = \alpha.\beta.SOZ + \alpha.\beta.SCJ.SOZ$$

The signal BL blocks the read not according to whether its value is one or zero, respectively.

A transition of the clock signal H'2 is needed to disable a command to read the buffer memory 2 and a command to write the elastic memory either if the counter 30 is in the count state representing $\alpha = \beta = 0$ when the signal for synchronizing the second half-byte of the byte Z arrives, whatever the value of the justification control signal for the frame in question, or if the counter 30 is in the count state representing $\alpha = \beta = 1$ if this synchronization signal arrives and the frame in question is justified.

There is claimed:

1. A device for inserting information bits into a specific frame structure at specific locations at least one of which may contain at least one justification opportunity bit, said device comprising:

means for dividing the incoming digital bit stream with bit rate D1 into N bit streams with a reduced bit rate D1/N, a buffer memory into which are written at the bit rate D1/N and read at the bit rate D2/N successive words of n bits from said dividing mean, where D2/N denotes a reduced insertion bit rate at which said words are inserted in the outgoing frames, associated with justification control means adapted to compare the read and write bit rates of said buffer memory and generate a justification command, an elastic memory having a capacity determined to contain at each time defined by the reduced insertion bit rate D2/N a variable number of bits of words read in said buffer memory and not yet inserted or not yet reinserted into the outgoing frames, said variable number varying according to previously generated justification commands, means for selecting at each time defined by the reduced insertion bit rate D2/N, and according to previously generated justification commands, n bits contained in said elastic memory which are to be inserted or are to be reinserted at this time, means for providing a signal representing a present value of said variable number, and means responsive to said signal for temporarily blocking the clock for reading said buffer memory if the justification command generated at a given time is such that the number of bits to be stored in said elastic memory exceeds a predetermined limit value.

2. Device according to claim 1, wherein said predetermined limit value for filling of said elastic memory is equal to $2n-1$ bits.

3. Device according to claim 1, wherein said specific location likely to comprise at least one justification opportunity bit comprises also at least one stuff bit, and the number of bits stored in said elastic memory and the control of said selector means, at each time defined by the reduced insertion bit rate D2/N are conditioned also by the number of frames constructed previously.

4. Device according to claim 1, wherein said elastic memory comprises first and second registers each of n bits forming a shift register for n-bit words, the first receiving words from the buffer memory.

5. Device according to claim 4, wherein said selector means comprise a set of n selector units adapted to select m first bits from said first register and n-m last bits from said second register for all values of m between one and n inclusive.

6. Device according to claim 5, wherein said predetermined limit value for filling of said elastic memory is equal to $2n-1$ bits and wherein the selector units are controlled by a counter with a capacity of n incremented at the reduced insertion bit rate for insertion of n-bit words likely to comprise a justification opportunity bit and comprising a stuff bit and the increment of which is adapted to assume one of two possible values according to the justification command.

7. Device according to claim 1, wherein $N = n$.

* * * * *